United States Patent
Beck et al.

(10) Patent No.: US 7,545,418 B2
(45) Date of Patent: Jun. 9, 2009

(54) IMAGE SENSOR DEVICE HAVING IMPROVED NOISE SUPPRESSION CAPABILITY AND A METHOD FOR SUPRESSING NOISE IN AN IMAGE SENSOR DEVICE

(76) Inventors: Jeffery Steven Beck, P.O. Box 1920, Denver, CO (US) 80201-1920; Yan Ping Lim, P.O. Box 1920, Denver, CO (US) 80201-1920; Ray Alan Mentzer, P.O. Box 1920, Denver, CO (US) 80201-1920

( * ) Notice: Subject to any disclaimer, the term of this patent is extended or adjusted under 35 U.S.C. 154(b) by 408 days.

(21) Appl. No.: 11/457,956

(22) Filed: Jul. 17, 2006

(65) Prior Publication Data

US 2008/0012966 A1   Jan. 17, 2008

(51) Int. Cl.
*H04N 5/217* (2006.01)
*H04N 9/64* (2006.01)
*H04N 5/335* (2006.01)

(52) U.S. Cl. .................. 348/241; 348/243; 348/245; 348/302

(58) Field of Classification Search ................ 348/193, 348/294–324, 241–251
See application file for complete search history.

(56) References Cited

U.S. PATENT DOCUMENTS

| | | | | |
|---|---|---|---|---|
| 4,355,335 A * | 10/1982 | Imaide et al. | ............... | 348/300 |
| 5,659,355 A * | 8/1997 | Barron et al. | ............... | 348/245 |
| 5,774,180 A * | 6/1998 | Abe et al. | .................... | 348/241 |
| 6,304,292 B1 * | 10/2001 | Ide et al. | ...................... | 348/243 |
| 6,618,087 B1 * | 9/2003 | Hokari et al. | ............... | 348/311 |
| 6,700,609 B1 * | 3/2004 | Abe | .......................... | 348/243 |
| 6,783,073 B2 * | 8/2004 | Yahagi et al. | .......... | 235/462.28 |
| 6,829,008 B1 * | 12/2004 | Kondo et al. | ................ | 348/302 |
| 6,900,837 B2 * | 5/2005 | Muramatsu et al. | ......... | 348/243 |
| 7,050,098 B2 * | 5/2006 | Shirakawa et al. | .......... | 348/245 |
| 7,057,655 B1 * | 6/2006 | Masuyama | .................. | 348/302 |
| 7,161,626 B1 * | 1/2007 | Nara | .......................... | 348/243 |
| 2001/0005226 A1 | 6/2001 | Muramatsu et al. | | |
| 2002/0196353 A1 * | 12/2002 | Nakahira et al. | ............ | 348/243 |
| 2004/0196392 A1 * | 10/2004 | Yahagi et al. | ............... | 348/241 |
| 2004/0263641 A1 * | 12/2004 | Tsuda | ..................... | 348/222.1 |
| 2005/0243193 A1 * | 11/2005 | Gove et al. | ................... | 348/241 |
| 2006/0114342 A1 * | 6/2006 | Egawa | ......................... | 348/241 |
| 2006/0192864 A1 * | 8/2006 | Mauritzson | ................. | 348/241 |

OTHER PUBLICATIONS

International Search Report, Appln. No. PCT/US2007/015799 dated Mar. 31, 2008.

* cited by examiner

*Primary Examiner*—Lin Ye
*Assistant Examiner*—Marly Camargo
(74) *Attorney, Agent, or Firm*—Ratner Prestia (57) ABSTRACT

An image sensor device is provided that has an uncovered imaging array of pixels and a covered global reference non-imaging array of pixels. The pixel samples of the global reference non-imaging array are used to remove noise from the pixel samples of the imaging array. The control signals and control lines that are used to sample the pixels of the imaging array are separate from and independent of the control signals and control lines that are used to sample the pixels of the global reference non-imaging array of pixels. For each row of pixels of the imaging array that is sampled, the same row of pixels of the global reference non-imaging array is sampled. The global reference row has no or very few offsets or variations to ensure that noise removal is performed effectively.

23 Claims, 4 Drawing Sheets

IMAGE SENSOR DEVICE HAVING IMPROVED NOISE SUPPRESSION CAPABILITY AND A METHOD FOR SUPRESSING NOISE IN AN IMAGE SENSOR DEVICE

TECHNICAL FIELD OF THE INVENTION

The invention relates to image sensor devices and to suppressing noise in image sensor devices.

BACKGROUND OF THE INVENTION

An image sensor device is an integrated circuit (IC) having an array of pixels and other circuitry and devices for sampling the pixels, outputting the sample values and processing the sample values. One problem that arises in image sensor ICs is that power supply noise results in temporal row-wise noise in the imaging pixels. One technique for suppressing the row-wise noise is to include reference columns of dark, non-imaging pixels in the imaging device that are used to remove noise from the imaging pixels. The "dark" pixels are covered with a metal layer that prevents light from impinging on the photodiodes of the pixels. Thus, the dark pixels are non-imaging pixels. The pixels that are not covered by the metal layer and that receive light are referred to as imaging pixels. By taking the difference between the values of the dark pixels and the values of the imaging pixels, temporal row-wise noise that results from power supply noise can be cancelled.

Figure 1:
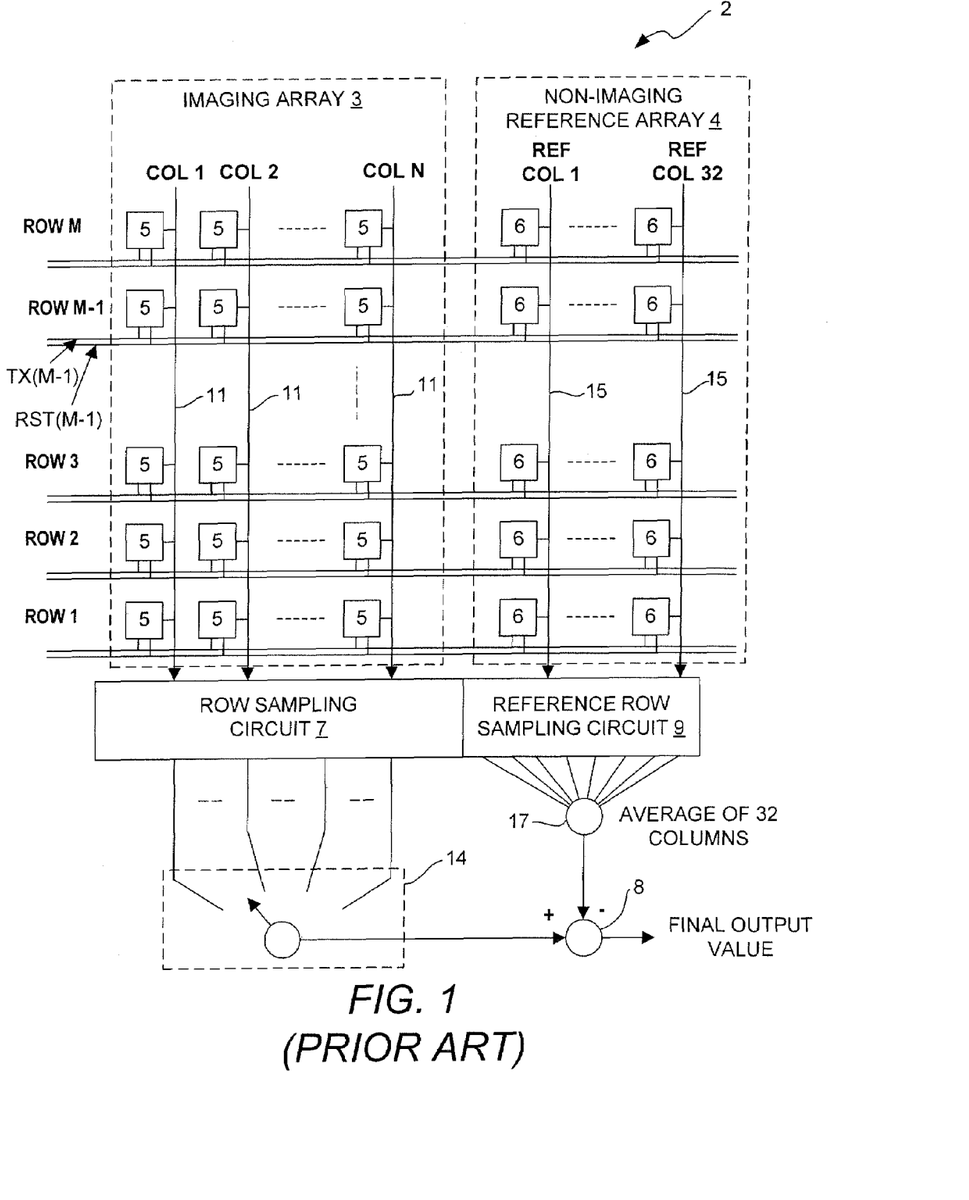
FIG. 1 illustrates a block diagram of a known image sensor device having an imaging array and a non-imaging array.

FIG. 1 illustrates a block diagram of a known image sensor device 2 having an imaging array 3 and a non-imaging array 4. The imaging array 3 is an array of pixels 5 that are uncovered and therefore receive light. The non-imaging array 4 is an array of dark pixels 6 that are covered by a metal layer (not shown), and therefore do not receive light. The rows of pixels 5 of the imaging array 3 and the rows of pixels 6 of the non-imaging reference array 4 use the same transfer and reset control lines TX and RST, respectively. Additionally, row sampling circuit 7 and reference row sampling circuit 9 use the same sampling signals, S1 and S2, (not shown) to sample the corresponding reset and video signals from the pixels. Accordingly, whenever the reset and video signals from a pixel in a row of the imaging array 3 are sampled (the difference between the reset sample and the video sample forming a pixel sample), corresponding reset and video signals from the same row in the non-imaging array 4 are sampled and used to cancel out row-wise noise from the pixel samples of the imaging array 3. For ease of discussion, the difference between the reset sample and the video sample values for a given pixel in the imaging array will be referred to herein as a pixel sample value. Likewise, the difference between the reset and video sample values for a given pixel in the non-imaging array 4 will be referred herein to as a dark pixel sample value.

For example, when the pixels 5 from Row M-1 of the imaging array 3 are sampled, the dark pixels 6 from Row M-1 of the non-imaging reference array 4 are also sampled. The pixel sample values of Row M-1 of the imaging array 3 are output on vertical route lines 11. The pixel sample values of Row M-1 of the non-imaging array 4 are output on vertical route lines 15. The row sampling circuit 7 samples and holds pixel reset and video signals that are presented on vertical route lines 11 of the imaging array 3. Reference row sampling circuit 9 samples and holds dark pixel reset and video signals that are presented on vertical route lines 15 of the non-imaging reference array 4. An average of dark pixel sample values is generated for each row in the non-imaging averaging circuit 17. The sample selection circuit 14 selects the pixel sample values in a sequential order starting with Col 1 and ending with Col N. As the pixel sample values are selected, they are provided to a difference circuit 8. The average value of the dark pixel sample values for the selected row in the non-imaging array is provided by the averaging circuit 17 to the difference circuit 8. The difference circuit 8 then subtracts the average dark pixel sample value for the samples received from the non-imaging array 4 from each of the pixel sample values received from the imaging array 3 for the same row to produce a final output value. The final output value is a sample value from which row-wise noise has been cancelled.

One problem associated with the technique described above with reference to FIG. 1 is that it is possible for one or more rows of the non-imaging array 4 to have an offset or variation in it due to factors such as process variations or defects, unmatched coupling of control signals into sample paths, power supply noise, etc. For example, an offset may result in a row of the non-imaging array 4 having a pixel in it that is too bright, which is often referred to as a "hot" pixel. When these offsets or variations exist in a particular row of the non-imaging array 4, using the sample average value for that row to remove noise will often result in artifacts being present in the final output image. These artifacts may make a row appear too bright or too dim.

Another problem associated with the technique described above with reference to FIG. 1 is that covering the non-imaging array 4 with metal creates a mismatch between the parasitic capacitance of the rows and columns of the non-imaging array 4 and the parasitic capacitance of the rows and columns of the imaging array 3. This mismatch in parasitic capacitance prevents perfect cancellation of row-wise noise during the pixel sampling operations.

Accordingly, a need exists for a method and apparatus for more effectively removing row-wise noise from pixel samples of an imaging array.

SUMMARY OF THE INVENTION

The invention provides an image sensor device having improved noise suppression capability and a method for performing noise suppression. The image sensor device comprises an uncovered imaging array having M rows and N columns of pixels, a covered global reference non-imaging array comprising at least one global reference row of non-imaging pixels, imaging array sampling logic, global reference sampling logic, averaging circuitry, and difference circuitry. The imaging array sampling logic is configured to sample M rows of the imaging array to obtain M sets of N image pixel sample values are obtained. The global reference sampling logic is configured to sample the same row of the global reference non-imaging array to obtain a set of reference pixel sample values. The same row of the global reference non-imaging array is sampled simultaneously with the sampling of each of the M rows of the imaging array such that M sets of reference pixel sample values are obtained. Each of the M sets of reference sample values is associated with a respective one of the M sets of image sample values. The averaging circuitry is configured to average each of the M sets of reference sample values to obtain M average values. The difference circuitry is configured to receive the selected image sample values from the imaging array sample selection circuitry and the M average values from the averaging circuitry, and to subtract each of the M average values from each of the N image sample values of the associated set of image sample values to obtain M sets of N output image sample values.

The method comprises sampling rows of pixels of an imaging array of the image sensor device to obtain respective sets of image sample values, concurrently with the sampling of each row of pixels of the imaging array, sampling a covered global reference row of non-imaging pixels to obtain respective sets of global reference sample values, averaging each set of global reference sample values to obtain a respective average reference sample value for each respective set of global reference sample values, and subtracting the respective average reference sample value from each image sample value of each respective set of image sample values to obtain respective sets of final image sample values.

These and other features and advantages of the invention will become apparent from the following description, drawings and claims.

DETAILED DESCRIPTION OF AN EXEMPLARY EMBODIMENT

As stated above with reference to FIG. 1, if a row of the non-imaging array 4 has an offset or variation in it, using a sample average from that row to cancel out noise from each sample value of the corresponding row of the imaging array 3 will result in artifacts being present in the final output image. In addition, the offsets that lead to these artifacts are fixed in nature, i.e., they occur in the same row or rows of the non-imaging array 4 frame after frame. Consequently, the final output image will typically have a bright or dim row in the same location in the image frame after frame.

This problem cannot be easily corrected when using the image sensor configuration shown in FIG. 1. Because the imaging array 3 and the non-imaging array 4 use the same TX and RST signal control lines along a given row, the average dark pixel sample value obtained from a particular row of the non-imaging array 4 is always subtracted from the pixel sample values obtained from the same row of the imaging array 3. For example, assuming Row 3 of the non-imaging array 4 has a hot pixel in it that results in an offset, but Row 2 does not, it is not possible with the configuration shown in FIG. 1 to use an average dark pixel sample value from Row 2 of the non-imaging array 4 to remove noise from pixel sample values obtained from Row 3 of the imaging array 3. The invention obviates this problem.

Figure 2:
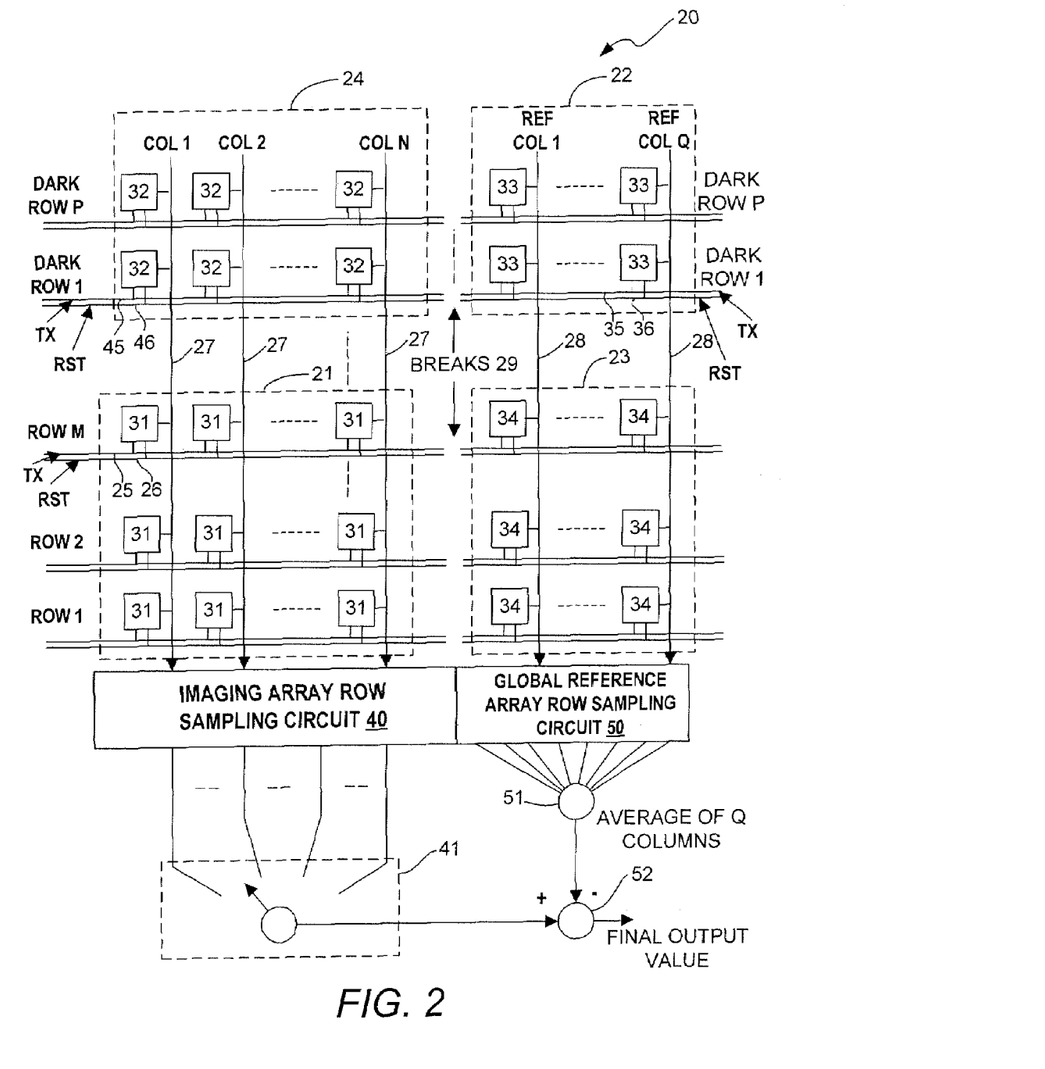
FIG. 2 illustrates a block diagram of the image sensor device of the invention in accordance with an exemplary embodiment.

FIG. 2 illustrates a block diagram of the image sensor device 20 of the invention in accordance with an exemplary embodiment. The image sensor device 20 comprises an imaging array 21, a dark global reference non-imaging array 22, an uncovered non-imaging matching array 23, and a dark non-imaging array 24. The imaging array 21 receives light and is sampled to produce an output image. The global reference non-imaging array 22 is covered and does not receive light. It is used to obtain average sample values that are subtracted from the sample values obtained from the imaging array 21 to remove row-wise noise.

The imaging array 21 uses TX and RST signal control lines 25 and 26 that are separate and independent from the TX and RST signal control lines 35 and 36 used by the global reference non-imaging array 22. This separation is indicated by the break 29 in the control lines. By making the control lines 25 and 26 of the imaging array 21 separate and independent from the control lines 35 and 36 of the global reference non-imaging array 22, it is possible to use the same global reference row as the reference for each of the rows in the imaging array. This eliminates unique reference values for each of the imaging rows and, thus, eliminates the possibility of variations between row reference values which result in fixed pattern row artifacts.

The non-imaging matching array 23 is an uncovered array of non-imaging pixels that receive light, but are not read. The matching array 23 is used only for the purpose of matching the parasitic capacitance of the vertical routes 27 of the imaging array 21 with the parasitic capacitance of the vertical routes 28 of the non-imaging arrays 22 and 23. Therefore, no TX and RST control signals are applied to the control lines of the non-imaging matching array 23. This ensures better rejection of power supply noise and better cancellation of row-wise noise.

The imaging array 21 is an M×N array of pixels 31, where M is the number of rows in the array 21 and N is the number of columns in the array 21. In this exemplary embodiment, the non-imaging matching array 23 is an M×Q array of pixels 34, where M is the number of rows in the array 23 and Q is the number of columns in the array 23. The dark non-imaging array 24 is a P×N array of pixels 32, where P is the number of rows in the array 24 and N is the number of columns in the array 24. Therefore, the dark non-imaging array 24 has the same number of columns as the imaging array 21, but may have a different number P of rows than the imaging array 21. The global reference non-imaging array 22 is a P×Q array of pixels 33. It should be noted that the invention is not limited with respect to the number of rows and columns that are present in these arrays.

While the global reference non-imaging array 21 of this exemplary embodiment has P rows and Q columns of pixels 33, only one of these rows (e.g., Dark Row 1) is used as the reference row for removing row-wise noise from each of the M rows of the imaging array 21. The other of these rows (e.g., Dark Row 2 through Dark Row P) are used only if a defective (e.g., a hot, time-varying, or otherwise faulty pixel) is found to exist in the first row. Thus, by ensuring that the row of the global reference non-imaging array 22 that is used for row-wise noise suppression has no fixed or time-varying offsets, it is ensured that row-wise noise is effectively suppressed.

Figure 3:
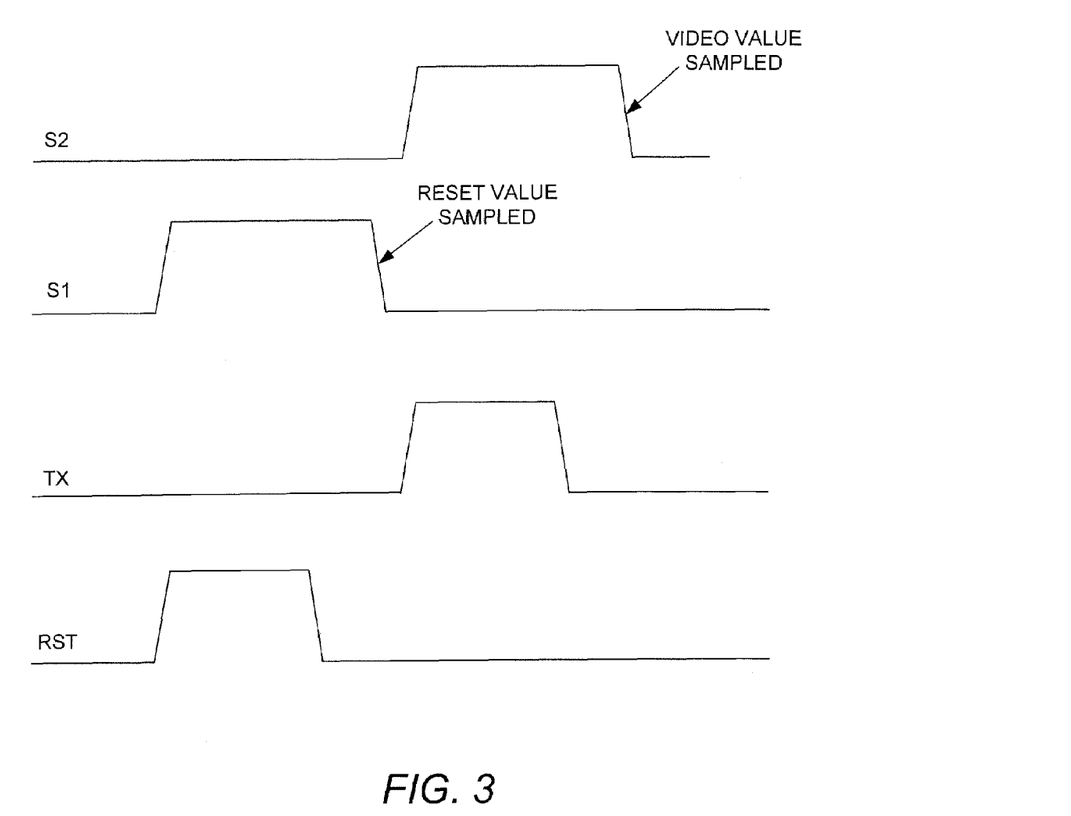
FIG. 3 illustrates a timing diagram that demonstrates the relative timing of the TX and RST control signals of the imaging array shown in FIG. 2 and the reset and video sampling signals S1 and S2 used in the imaging array row sampling circuitry shown in FIG. 2.

The sampling of the pixels 31 of the imaging array 21 and noise suppression will now be described with reference to one particular row, Row M, of the imaging array 21, and one row, Dark Row 1, of the global reference non-imaging array 22. Therefore, it is assumed for this example that Dark Row 1 of the global reference non-imaging array 22 is used for noise suppression. FIG. 3 illustrates a timing diagram that demonstrates the relative timing of the TX and RST control signals of the imaging array 21 and the reset and video sampling signals S1 and S2 used in the imaging array row sampling circuitry 40. The TX and RST control signals of the global reference non-imaging array 22 occur simultaneously with the TX and RST control signals of the imaging array 21. Likewise, the reset and video sampling signals S1 and S2 of the imaging array row sampling circuitry 40 occur simultaneously with the reset and video sampling signals S1 and S2 of the global reference non-imaging array row sampling circuitry 50. Therefore, a timing diagram is not provided for the TX and RST control signals of the global reference non-imaging array 22 and the S1 and S2 sampling signals of the global reference non-imaging array row sampling circuitry 50.

In the global reference non-imaging array 22, the RST control signal on line 36 goes high causing the reset sample values from all of the pixels 33 in Dark Row 1 to be simultaneously read and output onto the respective vertical route lines 28. The reset sampling signal S1 goes high after the RST control signal goes high. When the reset sampling signal S1 goes low, this triggers the sampling of the reset sample values on the vertical route lines 28 by the global reference non-imaging array row sampling circuitry 50. After the reset sampling signal S1 goes low, the TX control signal on line 35 goes high causing the video sample values from all of the pixels 33 in Dark Row 1 to be simultaneously read and output onto the respective vertical route lines 28. The video sampling signal S2 goes high after the TX control signal goes high. When the video sampling signal TX goes low, this triggers the sampling of the video sample values on the vertical route lines 28 by the global reference non-imaging array row sampling circuitry 50.

For each sampled pixel, the difference between the reset sample values and the video samples values is obtained and the difference values are converted into digital dark pixel sample values. The operations taking the difference between the reset and video sample values and converting the difference values into digital values may be performed by difference circuitry (not shown) and analog-to-digital conversion (ADC) circuitry (not shown) in the global reference non-imaging array row sampling circuitry 50. Alternatively, the differencing and ADC operations may be performed in circuitry that is external to the global reference non-imaging array row sampling circuitry 50. The digital dark pixel sample values are then averaged in averaging circuit 51 to obtain a single average sample value for Dark Row 1, which is then forwarded to difference circuit 52.

In the imaging array 21, the RST control signal on control line 26 goes high, which causes reset sample values for all of the pixels 31 in Row M to be simultaneously read and output onto the respective vertical route lines 27. The reset sampling signal S1 goes high after the RST control signal goes high. When the rest sampling signal S1 goes low, this triggers the sampling of the reset sample values on the vertical route lines 27 by the imaging array row sampling circuitry 40. After the reset sampling signal S1 goes low, the TX control signal on line 25 goes high causing the video sample values from all of the pixels 31 in Row M to be simultaneously read and output onto the respective vertical route lines 27. The video sampling signal S2 goes high after the TX control signal goes high. When the video sampling signal S2 goes low, this triggers the sampling of the video sample values on the vertical route lines 27 by the imaging array row sampling circuitry 40.

For each sampled pixel, the difference between the reset sample values and the video samples values is obtained and the difference values are converted into digital pixel sample values. The operations of taking the difference between the reset and video sample values and converting the difference values into digital values may be performed by difference circuitry (not shown) and analog-to-digital conversion (ADC) circuitry (not shown) in of the imaging array row sampling circuitry 40. Alternatively, the differencing and ADC operations may be performed in circuitry that is external to the non-imaging array row sampling circuitry 40.

As each pixel sample value is converted into a digital pixel sample value, it is selected by sample selection circuitry 41 and forwarded to difference circuitry 52. As the difference circuit 52 receives each digital pixel sample value from the sample selection circuitry 41, it subtracts the average dark pixel sample value for Dark Row 1 from the digital pixel sample value received from the sample selection circuit 41 and outputs a Final Output Value. The Final Output Value is the sample read value from the imaging array 21 with row-wise noise removed from it.

It should be noted that while some of the operations are described above as being performed in the analog domain and others in the digital domain, the invention is not limited with respect to whether operations are performed in the analog domain or the digital domain. The description provided above with reference to FIGS. 2 and 3 is of one exemplary embodiment of the invention.

The dark non-imaging array 24 is not used for imaging, but its pixels 32 may be read for other purposes using the TX and RST control signals on control lines 45 and 46. For example, the pixels 32 of the dark non-imaging array 24 may be sampled while the pixels 33 of the global reference non-imaging array 22 are being sampled and scanned for hot or otherwise faulty pixels. The row of the global reference array 22 that has no hot or faulty pixels, or the least number of hot or faulty pixels, is selected for use as the reference row for performing noise suppression.

In accordance with another exemplary embodiment, the global reference non-imaging array 22 is physically split such that one or more rows of the array 22 are located at the top of the image sensor device 20 and one or more rows of the array are located at the bottom of the image sensor device 20. In the undesirable event of bright light affecting the reference pixels, this configuration takes advantage of the fact that a bright light is far more likely to occur near either the top or bottom edges of the imaging array 21, rather than at both the top and bottom edges of the array 21. The reference row that is opposite the edge that is affected by the bright light is then used for noise suppression.

Figure 4:
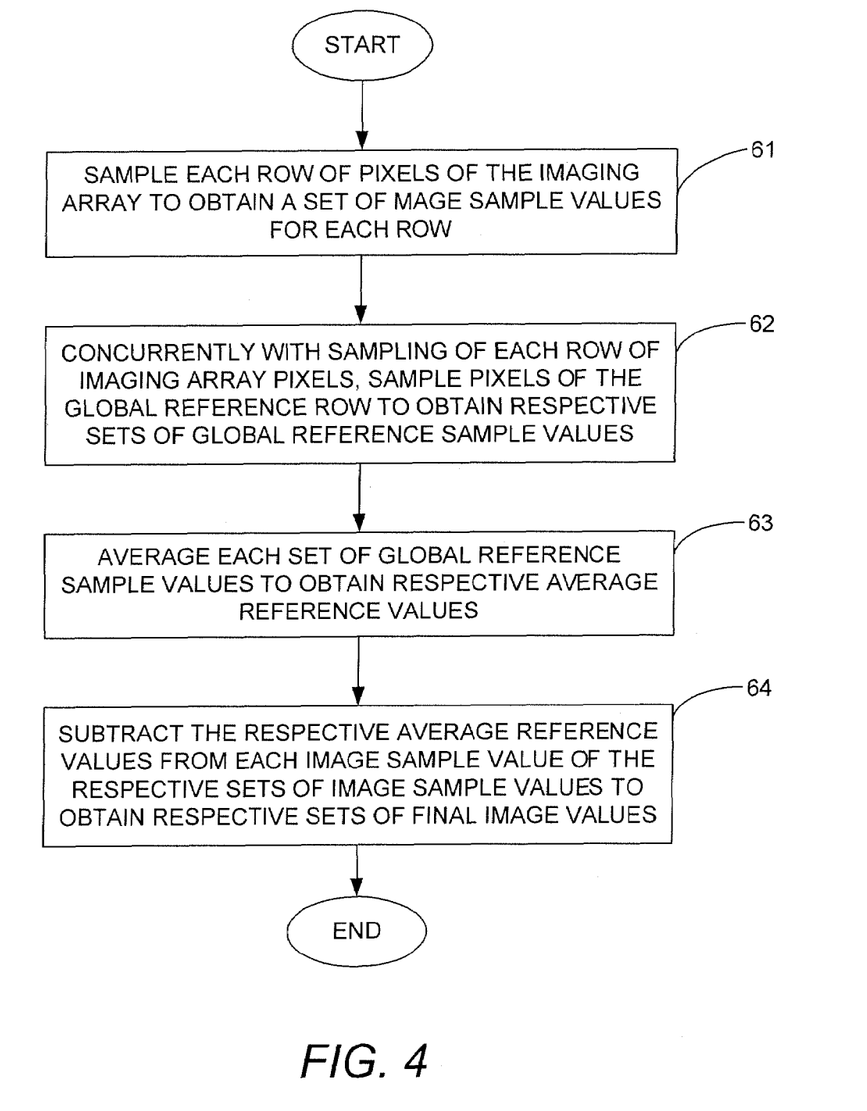
FIG. 4 illustrates a flowchart that represents the method of the invention for performing noise suppression.

FIG. 4 illustrates a flowchart that represents the method of the invention for performing noise suppression. Each row of pixels of the imaging array is sampled to obtain respective sets of image sample values for each pixel of each row of the imaging array, as indicated by block 61. Concurrently with the sampling of the row of pixels of the imaging array, a global reference row of pixels of a covered non-imaging array is sampled to obtain a set of global reference sample values for each respective set of image sample values, as indicated by block 62. The global reference sample values of each set are averaged to obtain respective average reference sample values for each respective set of global reference sample values, as indicated by block 63. The average reference sample values are subtracted from the image sample values of the respective sets of image sample values to obtain respective sets of final image values, as indicated by block 64.

It should be noted that the invention has been described with reference to particular embodiments for the exemplary purposes and to demonstrate the principles and concepts of the invention. The invention is not limited to the embodiments described herein. For example, the image sensor device 20 shown in FIG. 2 is only one of many possible configurations suitable for carrying out the invention. Those skilled in the art will understand, in view of the description provided herein, the manner in which modifications may be made to the embodiments described herein, and that all such modifications are within the scope of the invention.

What is claimed is:

1. An image sensor device comprising:
   an uncovered imaging array having M rows and N columns of pixels;
   a covered global reference non-imaging array comprising at least one global reference row, as at least one dark row of non-imaging pixels;
   imaging array sampling logic configured to sample each of the M rows of pixels of the uncovered imaging array to obtain M sets of image pixel sample values, each of the M sets of image pixel samples having N image pixel sample values;
   global reference non-imaging array sampling logic configured to sample one dark row of said covered global reference row non-imaging array to obtain a set of reference pixel sample values, and wherein said one dark row is sampled simultaneously with the sampling of each respective row of the M rows of the uncovered imaging array such that M sets of the reference pixel sample values from the one dark row are obtained;
   averaging circuitry configured to average each of the M sets of the reference pixel sample values to obtain M average values each associated with a respective set of the image pixel sample values of the M sets; and
   imaging array sample selection circuitry configured to select the N image pixel sample values of a respective set of the M sets of image pixel sample values from the uncovered imaging array;
   difference circuitry, for each of the M sets of image pixel sample values of the uncovered imaging array, configured to receive the selected set of image pixel sample values and the average value associated with the selected set of image pixel sample values of the uncovered imaging array from the averaging circuitry,
   wherein the difference circuitry is further configured to subtract the average value associated with the selected set of image pixel sample values from each of the N image pixel sample values of the selected set to obtain M sets of N output image sample values.

2. The image sensor array of claim 1, wherein the imaging array sampling logic further comprises:
   imaging array sampling circuitry configured to sample each of the M rows of the uncovered imaging array, wherein for each row of the uncovered imaging array that is sampled, a set of N image pixel sample values is obtained such that M sets of N image pixel sample values are obtained, wherein
   the imaging array sample selection circuitry is configured to select for each of the N image pixel sample values obtained by the imaging array sampling circuitry, and to forward the selected N image pixel sample values to the difference circuitry.

3. The image sensor device of claim 2, wherein the global reference non-imaging array sampling logic further comprises:
   global reference sampling circuitry configured to sample said one dark row concurrently with the sampling of each respective row of the M rows of the uncovered imaging array to obtain the M sets of reference pixel sample values.

4. The image sensor device of claim 1, wherein:
   the imaging array sampling logic includes analog-to-digital conversion (ADC) circuitry that converts each of the M sets of N image pixel sample values into M sets of N digital image sample values; and
   the global reference sampling logic includes further ADC circuitry that converts each of the M sets of reference pixel sample values into M sets of N digital reference pixel sample values, the averaging circuitry averaging the N digital reference sample values of each of the M sets of digital reference pixel sample values to obtain M digital average values, the difference circuitry subtracting digital average value associated with a respective set of image pixel sample values from the N digital image pixel sample values of the respective, associated set of image pixel sample values to obtain M sets of N digital output image sample values.

5. The image sensor device of claim 1, further comprising:
   an uncovered non-imaging array, coupled to the covered global reference non-imaging array, and configured to have a parasitic capacitance that at least approximately matches a parasitic capacitance of the imaging array.

6. The image sensor device of claim 1, wherein the covered global reference non-imaging array comprises at least first and second dark rows of non-imaging pixels, and wherein the first dark row corresponds to said one dark row sampled by the global reference sampling logic to obtain said M sets of reference pixel sample values, the first and second dark rows of non-imaging pixels being adjacent to each other.

7. The image sensor device of claim 1, further comprising:
   imaging array signal control lines for sampling the rows of imaging pixels of the imaging array; and
   global reference signal control lines for sampling said one dark row of non-imaging pixels, and wherein the imaging array signal control lines are separate from the global reference signal control lines.

8. The image sensor device of claim 1, wherein:
   the covered global reference row non-imaging array comprises at least first and second dark rows of non-imaging pixels;
   the first dark row of non-imaging pixels corresponds to said one dark row;
   said one dark row is located near an upper portion of the image sensor device; and
   the second dark row of non-imaging pixels is located near a lower portion of the image sensor device.

9. The image sensor device of claim 1, wherein:
   the covered global reference row non-imaging array comprises at least first and second dark rows of non-imaging pixels;
   the second dark row corresponds to said one dark row of non-imaging pixels;
   the first dark row is located near an upper portion of the image sensor device; and
   said one dark row of non-imaging pixels is located near a lower portion of the image sensor device.

10. The image sensor device of claim 1, wherein:
    the covered global reference row non-imaging array comprises at least first and second dark rows of non-imaging pixels;
    the first dark row corresponds to said one dark row of non-imaging pixels;
    the second dark row of non-imaging pixels is located near a first side portion of the image sensor device;
    said same one dark row of non-imaging pixels is located near a second side portion of the image sensor device; and
    the first side portion is generally opposite the second side portion.

11. An image sensor device comprising:
    an uncovered imaging array having M rows and N columns of pixels, the imaging array having a parasitic capacitance;

an uncovered non-imaging array having M rows and P columns of non-imaging pixels, the uncovered non-imaging array having a second parasitic capacitance that at least approximately matches the parasitic capacitance of the imaging array; and a covered global reference non-imaging array comprising at least one dark row of non-imaging pixels coupled to the uncovered non-imaging array such that the parasitic capacitance experienced by a imaging pixel and by a non-imaging pixel sampled simultaneously are approximately the same capacitance.

12. The image sensor device of claim 11 further comprising:

imaging array sampling logic configured to sample each of the M rows of pixels of the uncovered imaging array to obtain M sets of image pixel sample values, each of the M sets of image pixel samples having N image pixel sample values;

global reference non-imaging array sampling logic configured to sample one dark row of to obtain a set of reference pixel sample values, and wherein said one dark row is sampled simultaneously with the sampling of each respective row of the M rows of the uncovered imaging array such that M sets of reference pixel sample values from the one dark row are obtained;

averaging circuitry configured to average each of the M sets of reference pixel sample values to obtain M average values each associated with a respective one of the rows of the uncovered imaging array; and difference circuitry, for each of the M rows of the uncovered imaging array, configured to receive the selected image pixel sample values from the imaging array sample selection circuitry and the M average values from the averaging circuitry, the difference circuitry being configured to subtract the associated average values for the respective row of the uncovered imaging array from each of the N image pixel sample values of the associated set of image pixel sample values to obtain M sets of N output image sample values.

13. The image sensor device of claim 12, wherein the imaging array sampling logic comprises:

imaging array sampling circuitry configured to sample each of the M rows of the uncovered imaging array, wherein for each row of the uncovered imaging array that is sampled, a set of N image pixel sample values is obtained such that M sets of N image pixel sample values are obtained; and imaging array sample selection circuitry configured to select the N image pixel sample values obtained by the imaging array sampling circuitry, and to forward the selected N image pixel sample values to the difference circuitry.

14. The image sensor device of claim 13, wherein the global reference non-imaging array sampling logic further comprises:

global reference sampling circuitry configured to sample said one dark row concurrently with the sampling of each respective row of the M rows of the uncovered imaging array to obtain M sets of reference pixel sample values, each of the M sets of reference pixel sample values being associated with a respective one of the M sets of image pixel sample values.

15. The image sensor device of claim 12, wherein:

the imaging array sampling logic includes analog-to-digital conversion (ADC) circuitry that converts each of the M sets of N image pixel sample values into M sets of N digital image sample values; and the global reference sampling logic includes further ADC circuitry that converts each of the M sets of reference pixel sample values into M sets of N digital reference pixel sample values, the averaging circuitry averaging the N digital reference sample values of each of the M sets of digital reference pixel sample values to obtain M digital average values, the difference circuitry subtracting the M digital average value associated with a respective set of image pixel sample values from the N digital image pixel sample values of the respective, associated set of image pixel sample values to obtain M sets of N digital output image sample values.

16. The image sensor device of claim 12, wherein the covered global reference row non-imaging array comprises at least first and second dark rows of non-imaging pixels, and wherein the first dark row corresponds to said one dark row, said one dark row is located near an upper portion of the image sensor device, and the second dark row of non-imaging pixels is located near a lower portion of the image sensor device.

17. The image sensor device of claim 12, wherein the global reference row non-imaging array comprises at least first and second dark rows of non-imaging pixels, and wherein the second dark row of non-imaging pixels corresponds to said one dark row, the first dark row of non-imaging pixels is located near an upper portion of the image sensor device, and said one dark row of non-imaging pixels is located near a lower portion of the image sensor device.

18. A method for suppressing noise in an image sensor device, the method comprising:

sampling rows of pixels of an imaging array of the image sensor device to obtain an image pixel sample value for each pixel of the imaging array, the image pixel sample values for each row of pixels comprising respective sets of image pixel sample values;

concurrently with the sampling of each row of pixels of the imaging array, sampling a covered global reference row of non-imaging pixels of the image sensor device to obtain a dark reference pixel sample value for each pixel of the covered global reference row, the dark reference pixel sample values obtained for each sampling of the covered global reference row comprising respective sets of dark reference pixel sample values;

averaging each set of dark reference sample values to obtain a respective average dark reference sample value for each respective set of dark reference pixel sample values; and subtracting the respective average dark reference sample value associated with a set of image pixel sample values from a respective row of the imaging array from each image pixel sample value of the set of image pixel sample values for each row of the imaging array sampled to obtain respective sets of final image sample values.

19. The method of claim 18, further comprising:

prior to averaging each set of dark reference sample values, converting the image pixel sample values and the dark reference pixel sample values into digital image pixel sample values and digital dark pixel reference sample values, respectively.

20. The method of claim 18, wherein:

imaging array signal control lines are used for sampling the rows of imaging pixels of the imaging array;

global reference signal control lines are used for sampling the dark one dark row; and the imaging array signal control lines are separate from and independent of the global reference signal control lines.

21. The method of claim 18, further comprising:
prior to sampling the one dark row, scanning at least two rows of the global reference non-imaging array to determine which dark row of non-imaging pixels has no faulty pixels or the least number of faulty pixels, and sampling the dark row of pixels determined as having no faulty pixels or a least number of faulty pixels.

22. The method of claim 18, further comprising:
matching a parasitic capacitance of the imaging array of the image sensor device with a second parasitic capacitance of an uncovered non-imaging array of the image sensor device.

23. An image sensor device comprising:
an imaging array having a plurality pixels in rows and columns;
a non-imaging reference array including a plurality of pixels in at least one dark row;
a first sampling logic configured to sample a set of pixel values from each respective row of the imaging array;
a second sampling logic, separate for the first sampling logic, and configured to sample pixel values of one dark row of the non-imaging array such that each row of the imaging array is sampled simultaneously with the sampling of the one dark row of the non-imaging array to generate a composite correction value for each respective row of the imaging array; and
processing circuitry configured to receive each set of pixel values from each respective row of the imaging array and to subtract the generated composite correction value associated with a respective row of the imaging array from each pixel value of a corresponding set of pixel values from the imaging array for each set of pixel values.

* * * * *